United States Patent [19]

Lisec

[11] Patent Number: 4,704,512
[45] Date of Patent: Nov. 3, 1987

[54] APPARATUS FOR BUTT WELDING

[76] Inventor: Peter Lisec, Bahnhofstrasse 34, 3363 Amstetten-Hausmening, Austria

[21] Appl. No.: 826,627

[22] Filed: Feb. 6, 1986

[30] Foreign Application Priority Data

Feb. 25, 1985 [AT] Austria ................................ 555/85

[51] Int. Cl.⁴ ............................................. B23K 11/04
[52] U.S. Cl. ...................................... 219/101; 219/57; 219/97
[58] Field of Search ..................... 219/79, 57, 97, 101, 219/102, 104

[56] References Cited

U.S. PATENT DOCUMENTS 2,972,232  2/1961  Possis et al. ..................... 219/101 X
4,205,214  5/1980  Suzuki et al. ......................... 219/97

FOREIGN PATENT DOCUMENTS 2832789  3/1979  Fed. Rep. of Germany .
75212    2/1968  German Democratic Rep. ... 219/97
0612991  11/1948 United Kingdom ................ 219/101
615141   1/1949  United Kingdom .................. 219/97

Primary Examiner—E. A. Goldberg
Assistant Examiner—C. M. Sigda
Attorney, Agent, or Firm—Young & Thompson

[57] ABSTRACT

In an apparatus for the butt welding of hollow molding of aluminum with two contact clamps (4, 5), movable toward each other, for the ends of the moldings to be joined together, one contact clamp (4) is fixed at the machine frame, and the other contact clamp (5) is arranged on a table (3) supported at the machine frame (18) by way of two parallelogram guide arm pairs (19, 20). Trough-like recesses (15) are provided in the mutually opposing end faces of the contact clamps (4, 5), a conduit for the feeding of protective gas during the welding operation terminating in the zone between the contact clamps (4, 5).

8 Claims, 4 Drawing Figures

APPARATUS FOR BUTT WELDING

The invention relates to an apparatus for the butt welding of hollow moldings, especially moldings of aluminum, for spacer frames for insulating glass, with two contact clamps, movable toward each other, for the ends of the moldings to be joined together, wherein the contact clamps can be connected to a source of welding current.

The invention is based on the object of providing an apparatus of this type making it possible to butt-weld without problems even thin-walled moldings for spacer frames of insulating glass.

In attaining this object, the apparatus is distinguished according to the invention in that one contact clamp, preferably the contact clamp that is the second one as seen in the conveying direction, is fashioned to be fixed on the machine frame, and that the other, movable contact clamp is arranged on a table supported on the machine frame by way of two parallelogram guide arm pairs.

On account of the fact that only one of the contact clamps for effecting the feeding of one of the two moldings, necessary for the welding step, is fashioned to be movable, a considerable simplification of the construction and control of the apparatus of this invention is achieved; in this connection, the guidance of the table carrying the movable contact clamp by way of parallelogram guide arm pairs is substantially free of wear and tear, as contrasted to guidance on guide rails or the like.

The formation of the protective gas cushion, favorable for a proper welding step, in the zone of the ends of the moldings to be welded together is enhanced in accordance with this invention by trough-like recesses in the end faces of the contact clamps. In order to further prevent efflux of protective gas, the provision can be made according to the invention that the interspace between the spaced-apart contact clamps is covered by strips of a material which is electrically nonconductive, the strips being preferably attached to one of the contact clamps.

In a practical embodiment of the invention, the apparatus can be distinguished in that each of the contact clamps has a lower jaw exhibiting a guide groove for the hollow molding and a vertically adjustable, upper pressure jaw. The jaws of the contact clamps, which jaws consist, for example, of copper or a copper alloy, thus do not only serve for an exact guidance of the moldings to be welded together, but also simultaneously for current supply.

A robust arrangement results if the movable jaw is disposed on a vertically rearwardly projecting guide arm, which latter is engaged by a drive motor, preferably a pressure medium motor, for depressing the jaw.

An especially rugged construction of the table carrying the movable contact clamp is obtained if a pair of guide arms for the movable table is located essentially below the movable contact clamp, the guide arms of this guide arm pair being joined to form a frame.

The advancement of the movable contact clamp in the apparatus of this invention is advantageously controlled so that the feeding velocity is increased during the welding procedure. In this connection, it is expedient to interrupt the current supply at the end of the welding step and to make the ends of the moldings to be welded together then approach each other jerk-like. By such jolting movement, any oxide layer that may have been formed (especially in case of aluminum) is disrupted, and a homogeneous metal-to-metal bond is obtained. This method of advancing the movable clamping jaw can be attained especially easily by the provision of a counterpressure cylinder for the reciprocating motion of the table carrying the movable contact clamp, the counterpressure chamber of this cylinder being expandable shock-like by way of a seat valve.

Especially in case moldings for spacer frames are welded together to form longer moldings, or, alternatively, in case the two ends of a molding, bent into a spacer frame, are to be welded together, it is important to remove the weld beads. In this context, the apparatus of this invention is distinguished in that it includes, subsequently to the contact clamps, devices for removing weld beads by milling. It is here not so very much important that the wall be machined which later on is located on the outside in the insulating glass; accordingly, it is adequate within the scope of this invention to provide a milling device for machining the upwardly pointing wall, and a milling device for machining the sidewalls of the hollow molding.

Transporting of the molding, or alternatively the spacer frame, between the milling stations can be effected by providing, in the zone of the milling devices, a transport gripper reciprocatable in parallel to the conveying path of the hollow molding and being associated with the hollow molding, for the cycle-wise advancement of the welding spot into the region of the first milling device and subsequently thereto into the region of the second milling device.

In this connection, it proved expedient to arrange a hold-down between the milling devices for the clamping fixation of the hollow molding during the milling operations and during the idle stroke of the transport gripper.

Thanks to the structure of the transport gripper, which effects feeding in cycles, and of the clamping jaw, it is sufficient according to one embodiment of the invention to fashion the conveying path for the hollow moldings in the zone of the milling devices as a sliding track.

According to another embodiment of the invention, the provision can be made that the milling device comprises, for machining the upwardly pointing wall of the hollow molding, a milling tool rotationally driven about an axis in parallel to the conveying direction, this milling tool being slidable back and forth transversely to the conveying direction. This milling attachment for the upwardly pointing wall of the hollow molding can additionally be level-adjustable to adapt to differing thicknesses of the hollow moldings.

The invention also covers the feature that the milling tool for machining the sidewalls of the hollow molding has a locally fixed milling implement rotatable about a substantially vertical axis and guide rollers arranged on both sides of this implement, these guide rollers contacting one sidewall of the hollow molding, and that the milling tool furthermore comprises a milling implement displaceable on a slide transversely to the conveying direction and rotatable about a substantially vertical axis, the slide carrying guide rollers which, during the milling step, are in contact with the sidewall of the hollow molding, on both sides of the milling implement. This embodiment has the advantage that this milling device automatically adapts itself, without any further measures, to the width of the hollow molding to be machined.

According to one embodiment of the invention, the provision is made that the transport gripper, for the timed advancement of the hollow molding, comprises clamping jaws arranged on both sides of the hollow moldings, these jaws being simultaneously advanceable into contact with the sidewalls of the hollow molding, preferably from both sides, by means of a pressure medium motor. In this connection, the additional provision can be made that the clamping jaws of the transport gripper are arranged on a slide that can be displaced to and fro on guide rails by means of a drive motor, preferably a pressure medium motor. This feature can be realized in an especially simple way by guiding the clamping jaws on guide rails arranged at the slide, one clamping jaw being coupled with the piston and the other clamping jaw being coupled with the cylinder of a pressure medium motor.

The regulations of the movements of the movable table and optionally also the control of current supply to the contact clamps can take place by microswitches associated with the movable table and adjustable by means of micrometer calipers with respect to their switching instant.

If the apparatus of this invention is to be used for welding together the ends of a hollow molding bent into the shape of a spacer frame, which ends are ordinarily located in the zone of a frame leg, then it is advantageous that, according to the invention, a supporting wall inclined rearwardly by a few degrees projects upwardly from the guide track for the hollow moldings bent into spacer frames, and that cutouts are provided in the supporting wall for the clamping jaws, the milling devices, and the hold-down jaw.

In contrast thereto, if it is intended to weld hollow moldings, fed linearly to the apparatus, together into longer units, of which then sections of a predetermined length are to be passed on, for example, to an installation for the bending of hollow moldings into spacer frames for insulating glass, then an embodiment is expedient wherein, after the contact clamps, a measuring member detecting the length of the hollow molding is arranged, for example an incremental pickup equipped with a wheel traveling along the moving hollow molding, and a severing device, e.g. a circular cross-cut saw or the like, is operatively coupled with the measuring member in order to cut to size molding sections of a predeterminable length. It is readily possible with this measure to cut to size sections having a predetermined length from the welded-together hollow molding pieces.

In case the hollow moldings, as mentioned above, are passed on to a device for bending the same into spacer frames for insulating glass, then it is advantageous to know the center of the hollow molding section. In this connection, the provision can be made within the purview of this invention to couple with the measuring member a marking tool for marking the center of a molding section that has been cut to size or that is to be cut to size. The marking tool herein can exhibit, according to the invention, a lever pivotable about an axis extending transversely to the conveying direction, including a lug facing the upper wall of the hollow molding and making a notch marking therein; a pressure medium cylinder or the like is provided for pivoting the marking lever.

Additional details and features of the invention can be seen from the following description of a preferred embodiment thereof. In the drawings.

Figure 1:
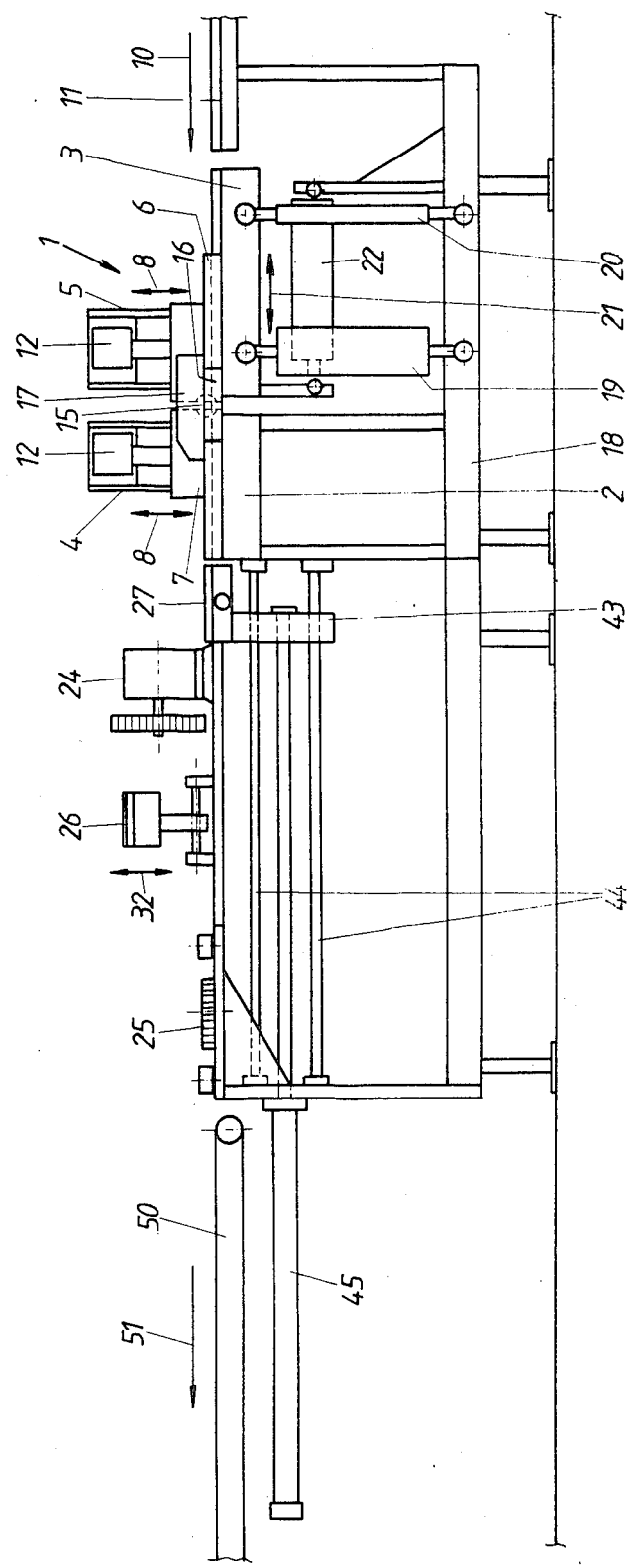
FIG. 1 shows a butt welding machine for tubular moldings in a lateral view.

Two contact clamps 4 and 5 are arranged on a table 1 divided into two halves 2 and 3 transversely to the plane of the illustration of FIG. 1. Each of the contact clamps 4 and 5 comprises a lower jaw 6 mounted on the table 3, as well as a pressure jaw 7 that can be reciprocated in the direction of double arrows 8. As can be seen, in particular, from FIG. 2, each of the lower jaws 6 has a guide groove 9 for a hollow molding fed along a conveying means 11 in the direction of arrow 10, for example a molding made of aluminum or aluminum alloy, as utilized for spacer frames for insulating glass panes.

The pressure jaws 7 of the contact clamps 4 and 5 can be moved up and down (arrows 8) with the aid of pressure medium motors 12, the pressure medium motors 12 being fastened to racks 13 erected on the tables and engaging guide arms 14 carrying the pressure jaws 7.

Figure 2:
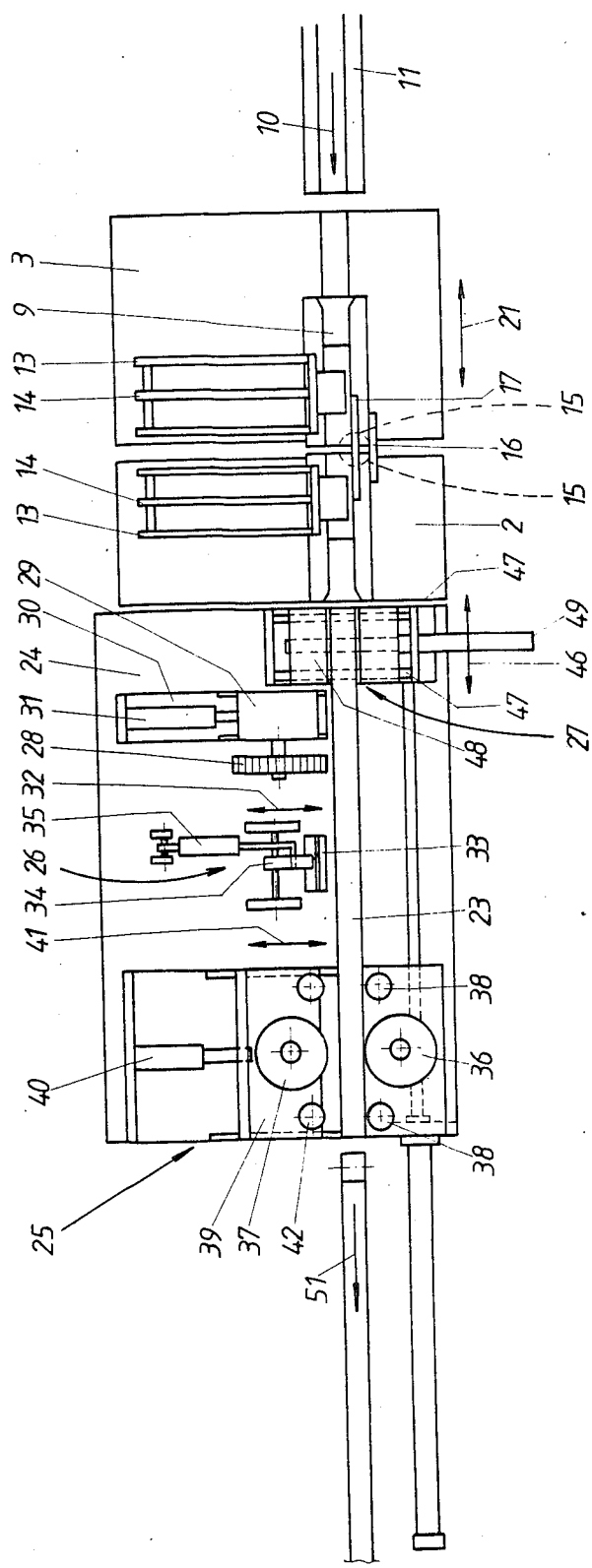
FIG. 2 shows the machine of FIG. 1 in a top view.

As indicated in FIG. 1 and FIG. 2, trough-like recesses 15 are provided in the mutually opposing end faces of the jaws 6 and the pressure jaws 7 of the two contact clamps 4 and 5. Thereby the formation of a protective gas cushion is enhanced, the protective gas being introduced by way of a conduit, not shown, into the junction zone between the two contact clamps 4 and 5. This formation of a cushion of protective gas is additionally supported by cover strips 16 and 17, consisting of a material which is electrically nonconductive, these strips being connected with the contact clamp 5.

Figure 4:
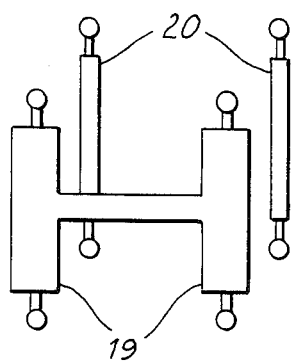
FIG. 4 is a detail in perspective showing the two pans of guide arms.

The movable part 3 of the table 1 is movable on the machine frame 18 by way of two guide arm pairs 19 and 20 in the direction of the double arrow 21; a pressure medium motor 22 is provided for this purpose. It can be seen from FIG. 1 that the guide arm pair arranged below the contact clamp 5 is of a more massive structure, the guide arms of this guide arm pair 19 being preferably joined together into frame (see FIG. 4.) The path of horizontal movement of part 3 is so short that its vertical component is negligible; hence it is sufficiently accurate to represent this path by the horizontal arrow 21.

The drive motor 22 for the movable table 3 is a counterpressure cylinder which can be acted upon by a pressure medium so that the advancing speed during the welding operation is continuously raised. In the counterpressure section of the pressure medium cylinder 22, a seat valve is arranged, permitting sudden expansion, so that at the end of the welding operation, with the current having already been turned off, a brief strike of the molding section held in the movable contact clamp 5 against the molding section held in the fixed contact clamp 4 is executed.

Figure 3:
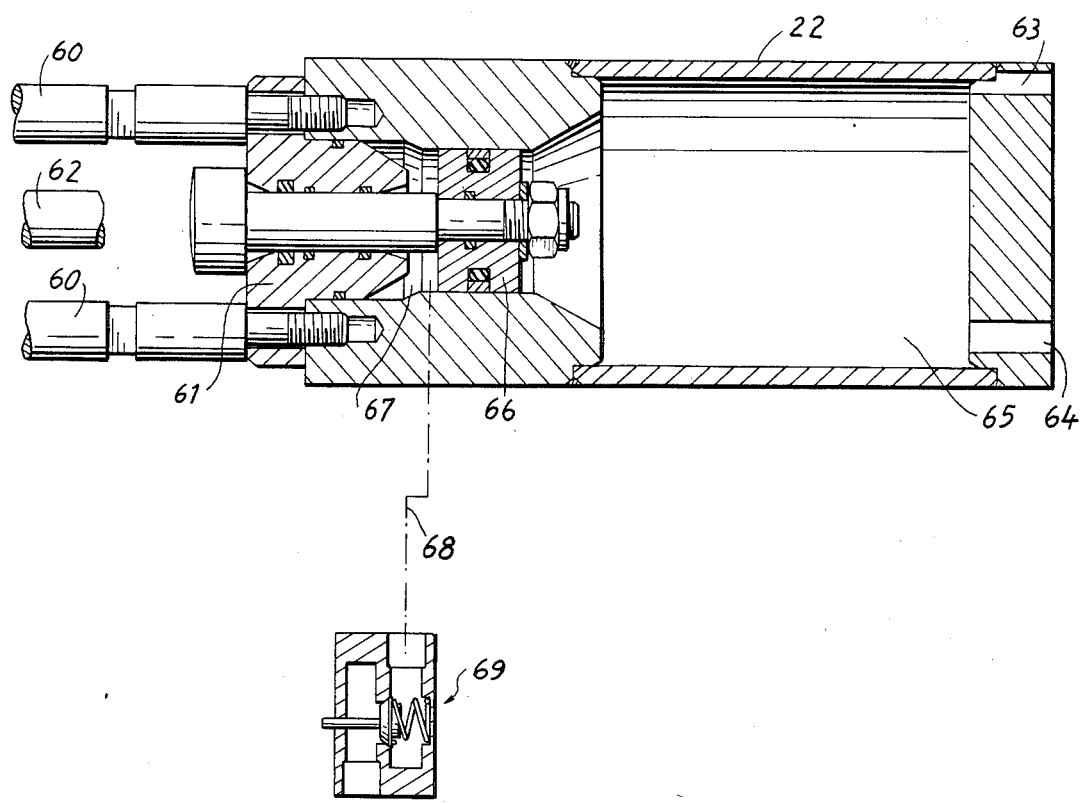
FIG. 3 is a cross-sectional view of the drive motor for the movable half of the table.

The counterpressure cylinder 22 is shown in greater detail in cross section in FIG. 3. As will there be evident, it is connected by tie rods 60 to the machine frame. The end member 61 of cylinder 22 sealingly slidably receives a piston rod 62 connected to the movable table 3.

Fluid under pressure from a source thereof (not shown) is introduced through conduit 63 and withdrawn through conduit 64 from a chamber 65 in cylinder 22, that serves as an accumulator chamber. A piston 66 on piston rod 62, of much smaller diameter than the interior of chamber 65, separates chamber 65 from a chamber 67 of much smaller volume than chamber 65. A conduit 68 interconnects chamber 67 with a dump valve 69, that can be mechanically opened against the pressure in chamber 67, thereby to cause a sudden reduction in the pressure of chamber 67 and allow piston 66 to be thrust abruptly to the left as seen in the drawings, by the accumulated pressure in chamber 65. This possibility, in combination with the relatively small horizontal stroke of movable table 3, permits rapid advance of piston 66 and with it the table 3, to effect the brief strike of the two molding sections against each other, described above. The return stroke of piston 66, to the right in FIG. 3, is effected by the supply of fluid under pressure to chamber 67 through a further pressure fluid supply conduit (not shown).

Control of the movements and preferably also of the welding current is performed by microswitches associated with the movable table 3, the switching points thereof being adjustable by micrometer calipers. Following the table 1, in the zone of the guide track for the welded-together hollow moldings, fashioned as a sliding track 23, two milling devices 24 and 25 are provided, and between the latter a hold-down 26 is arranged. In order to advance, in cycles, the welding position of the hollow moldings from the milling device 24 to the milling device 25, a transport gripper 27 is furthermore provided.

The milling device 24 is associated with the upwardly pointing wall of a hollow molding in order to remove the welding bead present at that location. For this purpose, the milling disk 28 of the milling device 24 and its drive motor 29 can be reciprocated on a sliding plate 30. equipped with guide means by a pressure medium motor 31 in the direction of double arrow 32.

The hold-down 26 comprises a hold-down jaw 33, optionally carrying a lining of a soft material, this jaw being mounted on a lever 34 to be pivotable by a pressure medium motor 35.

The milling device 25 serves for machining the sidewalls of a hollow molding to remove weld beads in the zone of the welding spot, present at that location. For this purpose, the milling device 25 has two milling disks 36 and 37, the milling disk 36 and the bilaterally arranged guide rollers 38 being attached fixedly to the machine frame. The milling disk 37, in contrast thereto, can be displaced forwards and backwards on a slide 39 by a pressure medium motor in the direction of double arrow 41. For performing the milling work, the pressure medium motor 40 is actuated and the milling disk 37 contacts, through the guide rollers 42 associated therewith, the sidewall of the hollow molding facing the disk. Thanks to the guide rollers 38 and 42, a special control with consideration of the width of the hollow molding to be machined is unnecessary.

The transport gripper 27 comprises a slide 43 that can be reciprocated on guide rods 44 by means of a pressure medium motor 45 (arrow 46). Clamping jaws 48, arranged on both sides of the guide track 23, are displaceably mounted on guide rods 47 on the slide 43. A pressure medium cylinder 49 is provided for operating the clamping jaws 48, the piston rod being connected to one of the clamping jaws 48, and the jacket of the cylinder being connected with the other of the clamping jaws, so that these jaws are operated simultaneously upon activation of the pressure medium cylinder.

By a corresponding operation of the pressure medium cylinder 45, the welding spot is first conveyed into the region of the milling device 24 for the upwardly pointing wall of the hollow molding; then the hold-down 26 is activated, whereupon the transport gripper 27 starts another stroke and, after detachment of the hold-down 26, moves the welding spot into the zone of the milling device 25. After the two sidewalls and the top wall of the hollow molding have thus been machined, the molding can be transported away by means of a conveyor belt 50 in the direction of arrow 51.

The free-floating mounting of the table 3 carrying the movable contact clamp 5, in accordance with this invention, has the advantage over conventional welding installations wherein the movable contact clamp is mounted on a freely standing, resilient plate, particularly with respect to the welding of thin-walled moldings (e.g. spacer frame tube moldings), that the vibrations that impair the quality of the welding bond, occurring in the conventional devices, cannot take place. Such damaging vibrations do not arise in that apparatus of this invention, with the movable contact clamp being mounted in a free-floating fashion, even while executing the above-mentioned, jerk-like movement of the moldings to be welded together.

What is claimed is:

1. Apparatus for butt welding together ends of hollow modings, especially moldings of aluminum, for spacer frames for insulating glass, said apparatus comprising: a fixed frame; first and second contact clamps movable toward each other, each said clamp being adapted to hold a molding end to be welded, said clamps being connectable to a source of welding current; means for conveying moldings toward said clamps in a given direction, said first clamp being disposed upstream of said second clamp along said given direction and said second clamp being fixed to said frame; a table mounted for reciprocal, substantially horizontal displacement in said given direction, said first clamp being fixed to said table; first and second pairs of parallel, substantially vertically extending guide arms pivotally interconnecting said table and said frame said first pair being disposed upstream of said second pair of guide arms along said given direction, each said pair of guide arms being horizontally spaced in a direction substantially perpendicular to said given direction; means rigidly interconnecting said second pair of guide arms; pressure medium cylinder means for effecting said displacement of said table, said pressure medium cylinder means comprising a counterpressure cylinder having a counterpressure chamber and a secondary chamber in pressure medium-communication with a seat valve.

2. Apparatus according to claim 1, wherein said clamps are spaced apart along said given direction to form an interspace, and said apparatus further comprises strips of an electrically non-conductive material covering said interspace, said strips being fixed to said first clamp.

3. Apparatus according to claim 1, wherein each said clamp comprises: a lower jaw having a guide groove for holding a molding, and a vertically displacable, upper pressure jaw.

4. Apparatus according to claim 3, and means for vertically displacing each said upper pressure jaw, comprising a guide arm adapted to press down on said vertically displaceable jaw, and a drive motor for urging said guide arm to press down on said vertically displaceable jaw.

5. Apparatus according to claim 1, and at least one milling device disposed downstream of both said clamps along said given direction, said at least one milling device being adapted to contact hollow moldings after butt welding.

6. Apparatus according to claim 5, wherein said at least one milling device is two milling devices spaced apart along said given direction, and said apparatus further comprises a transport gripper disposed intermediate said two milling devices, said gripper being horizontally displaceable along and opposite said given direction, said gripper being adapted to advance said hollow molding from one said milling device to the other said milling device.

7. Apparatus according to claim 6, and a holddown for clamping said holow moldings at and intermediate said two milling devices.

8. Apparatus according to claim 6, and first means driving one of said two millng devices about an axis parallel to said given direction, and second means for driving the other of said two milling devices about an axis perpendicular to said given direction.

* * * * *